United States Patent Office 2,975,173
Patented Mar. 14, 1961

2,975,173
DERIVATIVES OF 11α-HYDROXY-11,19-EPOXYANDROSTANES

John S. Baran, Chicago, Ill., assignor to G. D. Searle & Co., Chicago, Ill., a corporation of Delaware No Drawing. Filed Sept. 28, 1959, Ser. No. 842,565
8 Claims. (Cl. 260—239.55)

The present invention relates to novel derivatives of 11α-hydroxy-11,19-epoxyandrostanes and, more particularly, to the compounds of the general structural formula

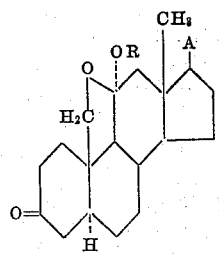

wherein R is a member of the class consisting of hydrogen and lower alkyl radicals and A is a member of the class consisting of —CO—CH$_2$OH, —CO—CH$_2$I, —CO—CH$_3$ and —COOH radicals.

The compounds of this invention are conveniently prepared from the corresponding 3-oxo-11α-alkoxy-11,19-epoxy-5α,14α-card-20(22)-enolides of the structural formula

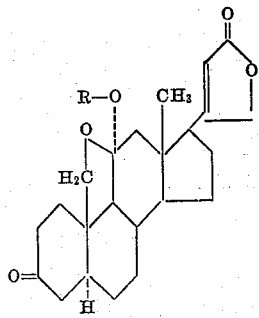

wherein R is a lower alkyl group. These cardenolides are subjected to ozonolysis and then treated with zinc and an organic acid to yield an 11α-alkoxy-11,19-epoxy-21-hydroxypregnane-3,20-dione of the structural formula

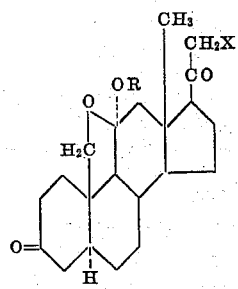

wherein R is a lower alkyl group and X is a hydroxyl group. This hydroxyl group can be esterified with p-toluenesulfonyl chloride in pyridine and the resulting ester, on treatment with an alkali metal iodide, yields the corresponding compound in which X is iodine. Reduction with zinc and acid causes replacement of the iodo group with a hydrogen atom. The 11-alkoxy compounds are deetherified to the 11-hydroxy derivatives by treatment with aqueous acid, e.g. p-toluenesulfonic acid.

Treatment of 11α - alkoxy-11,19-epoxy-21-hydroxy-pregnane-3,20-diones with alkali metal metaperiodates yields 3-oxo-11α - hydroxy - 11,19-epoxyandrostane-17β-carboxylic acid which, on treatment with a lower alkanol of the formula ROH in the presence of a catalytic amount of such acids as p-toluenesulfonic acids yields 3-oxo-11α-alkoxy-11,19 - epoxyandrostane - 17β-carboxylic acids.

The compounds claimed are active pharmacological agents. Thus, they inhibit the sodium retention produced by desoxycorticosterone. The invention will appear in further detail from a consideration of the examples presented herewith. However, the invention is not to be construed as limited in spirit or in scope by the details set forth herein. In these examples quantities are indicated in parts by weight.

*Example 1*

A mixture of 30 parts of chromic anhydride and 400 parts of pyridine is prepared by adding the chromic anhydride to the pyridine with stirring over a period of one hour at 15–20° C. To this mixture is added a slurry of 30 parts of ouabagenin-1,19-acetonide and 400 parts of pyridine. After the mixture has been stirred for one day, it is diluted with 1500 parts of chloroform and filtered. The filtrate is extracted with 500 parts of saturated aqueous solution of sodium bicarbonate, dried over sodium sulfate, and taken to dryness under vacuum. The residue is dissolved in 1000 parts of ethanol and the solution is stirred at reflux for 1 hour with 290 parts of basic alumina. The mixture is filtered and the alumina is extracted with hot ethanol; the combined filtrate and extract is concentrated under vacuum to a small volume. The crystalline product is collected on a filter, washed with ethanol and dried at 60° C. The 3,11-dioxo-5β, 14β,19-trihydroxycarda-1,20(22)-dienolide thus obtained melts at about 195–200° C.

A mixture of 2 parts of this product, 100 parts of ethanol and 0.2 part of a 5% palladium-on-charcoal catalyst is stirred in an atmosphere of hydrogen until one molecular equivalent of hydrogen is absorbed. Then the mixture is diluted with methanol until the product which precipitates partially during the hydrogenation is dissolved. The mixture is then filtered and the filtrate is concentrated under vacuum at 25° C. to a small volume. The resulting solid is collected on a filter, washed with methanol and dried. Crystallization from acetone-methanol yields 3-oxo-5β,11α,14β - trihydroxy - 11,19-epoxy-card-20(22)-enolide which melts at about 178–181° C. Infrared maxima are observed at 2.82, 2.90, 3.38, 5.69–5.77, 5.86, 6.13, 8.61, 9.73, 10.30, and 11.07 microns. A methanolic solution shows an ultraviolet maximum at 218 millimicrons with an extinction coefficient of about 17,300. The compound is in equilibrium with 3,11-dioxo-5β,14β,19-trihydroxycard-20(22)-enolide. The compounds thus in equilibrium have the structural formulas

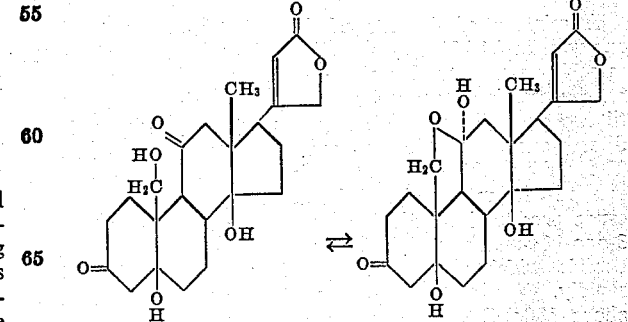

A mixture of 2 parts of 3-oxo-5β,11α,14β-trihydroxy-11,19-epoxycard-20(22)-enolide and 10 parts of acetic acid is refluxed for 10 minutes and then evaporated to dryness under vacuum. The residue is triturated with acetone and petroleum ether to yield a crystalline product. This is collected by filtration, washed with acetone and dried. Crystallization of the crude product from acetone yields 3-oxo-11α,14β - dihydroxy - 11,19-epoxy-carda-4,20(22)-dienolide melting at about 248–250° C. Infrared maxima are observed at 2.89, 3.38, 5.71, 5.83, 6.02, 6.16, 8.70, 9.71, 11.30, 11.56, and 12.30 microns. A methanolic solution shows ultraviolet maxima at 218 and 244 millimicrons with extinction coefficients of about 20,000 and 14,300, respectively.

A solution of 6 parts of 3-oxo-11α,14β-dihydroxy-11,19-epoxycarda - 4,20(22) - dienolide, 60 parts of methanol and 0.5 part of p-toluenesulfonic acid is stirred for several hours and then concentrated to a small volume. The solid which precipitates is collected by filtration, washed with methanol, and dried. Crystallization from ethanol yields 3-oxo - 11α-methoxy-11,19-epoxy-14β-hydroxy-carda-4,20(22)-dienolide which melts at about 258–261° C. Infrared maxima are observed at 2.82, 3.40, 5.77, 6.02, 6.18, 7.69, 8.37, 9.09, 10.36, and 11.64 microns. A methanolic solution shows ultraviolet maxima at 219 and 240 millimicrons with extinction coefficients of about 22,000 and 17,500, respectively. The specific rotation of a 1% chloroform solution $\alpha_D$ is +149.8°.

Substitution of 70 parts of ethanol for the methanol used in the preceding process yields 3-oxo-11α-ethoxy-11,19-epoxy-14β-hydroxycarda-4,20(22) - dienolide. Ultraviolet maxima are shown by a methanolic solution at about 219 and 240 millimicrons with molecular extinction coefficients of about 21,800 and 17,300, respectively.

*Example 2*

To a mixture of 20 parts of 3-oxo-11α-methoxy-11,19-epoxy - 14β - hydroxycarda - 4,20(22) - dienolide and 100 parts of pyridine is added a solution of 6.4 parts of thionyl chloride in 25 parts of pyridine at 0° C. After 10 minutes the solution is diluted with 350 parts of chloroform. The organic solution is washed with saturated aqueous sodium bicarbonate, dried over sodium sulfate and evaporated to dryness under vacuum. Crystallization of the crude product from dichloromethane yields 3-oxo-11α-methoxy-11,19-epoxycarda-4,14,20(22)-trienolide melting at about 212–214° C. Infrared maxima are observed at 3.44, 5.72, 6.05, 6.14, 6.22, 9.30, 9.51, 10.05, 11.62, and 12.50 microns. A methanolic solution shows ultraviolet maxima at 217 and 241 millimicrons with molecular extinction coefficients of about 20,200 and 18,500, respectively. The specific rotation of a 1% chloroform solution is +119.5°.

Substituting as a starting material 3-oxo-11α-ethoxy-11,19-epoxy-14β-hydroxycarda-4,20(22)-dienolide there is obtained 3-oxo-11α-ethoxy - 11,19 - epoxycarda - 4,14,20(22)-trienolide. The ultraviolet absorption spectrum shows maxima at 217 and 241 millimicrons with molecular extinction coefficients of about 20,000 and 18,500, respectively.

*Example 3*

A mixture of 4 parts of 3-oxo-11α-methoxy-11,19-epoxycarda-4,14,20(22)-trienolide, 40 parts of ethyl acetate, 40 parts of methanol and 1 part of 5% palladium-on-charcoal is stirred in an atmosphere of hydrogen until two equivalents have been absorbed. The mixture is filtered and the filtrate is concentrated to a small volume. The residue which precipitates is collected by filtration, washed with methanol and dried. Crystallization of the crude product from dichloromethane in methanol yields 3-oxo-11α-methoxy-11,19-epoxy - 5α,14α - card - 20(22)-enolide which melts at about 192–194° when heated rapidly. When heated slowly it appears to soften at about 190° C. and then melts at about 230–250° C. Infrared maxima are observed at 3.40, 5.70, 5.83, 6.15, 8.70, 9.88, 11.20 and 11.50 microns. A methanolic solution shows an ultraviolet maximum at 217 millimicrons with an extinction coefficient of about 15,000.

The specific rotation of a 1% chloroform solution is +126.5°. The compound has the structural formula

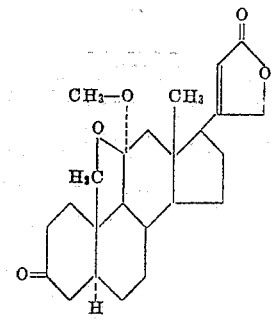

Substitution as a starting material of 3-oxo-11α-ethoxy-11,19 - epoxycarda - 4,14,20(22)-trienolide yields 3-oxo-11α-ethoxy-11,19-epoxy - 5α,14α - card - 20(22)-enolide. Infrared maxima are observed at about 3.39, 5.71, 5.83, and 6.14 microns.

*Example 4*

A solution of 1 part of 3-oxo-11α-methoxy-11,19-epoxy-5α,14α-card-20(22)-enolide, 100 parts of dichloromethane and 100 parts of ethyl acetate is saturated with ozone for 3 hours at −60°. The solution is then stirred with 1 part of zinc and 5 parts of acetic acid for 5 minutes. The mixture is diluted with dichloromethane and filtered. The filtrate is washed with aqueous sodium bicarbonate, dried over sodium sulfate, and evaporated to dryness under vacuum. The residue is dissolved in 50 parts of methanol and mixed with a solution of 0.5 part of potassium bicarbonate in 30 parts of water. The mixture is stirred for 16 hours and then extracted with chloroform. The chloroform extract is dried over sodium sulfate and evaporated to dryness. The residue is triturated with acetone and ether to yield crude 11α-methoxy - 11,19 - epoxy-21-hydroxy-5α-pregnane - 3,20-dione which upon recrystallization from acetone melts at about 178–180° C. Infrared maxima are observed at 2.96, 3.39, 5.83, 9.13, 9.95, 10.18, 10.90, 11.50, 13.18 microns. The specific rotation of the chloroform solution $[\alpha]_D$ is +134.5°. The compound has the structural formula

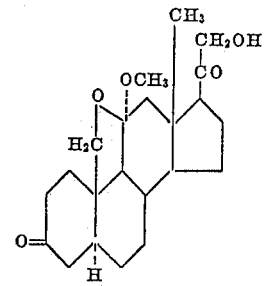

Substituting as the starting material 3 - oxo - 11α-ethoxy-11,19-epoxy-5α,14α-card-20(22)-enolide there is obtained 11α-ethoxy-11,19-epoxy - 21 - hydroxy-5α-pregnane-3,20-dione. Infrared maxima are observed at 2.96, 3.4 and 5.83 microns.

*Example 5*

To a solution of 2 parts of 11α-methoxy-11,19-epoxy-21-hydroxy-5α-pregnane-3,20-dione in 50 parts of acetone and 20 parts of water is added 0.1 part of p-toluenesulfonic acid. The solution is concentrated to a small volume at room temperature and a crystalline precipitate forms which is collected by filtration, washed and dried. Recrystallized from acetone and petroleum ether, the 11α-hydroxy-11,19-epoxy - 21 - hydroxy-5α-pregnane-3,20-dione melts at about 165–167° C. Infrared maxima are observed at about 2.88, 3.39, 5.83, 9.90, 10.74 and 11.18 microns. The specific rotation of the chloroform solution $[\alpha]_D$ is +107°.

Example 6

A mixture of 1.9 parts of 11α-methoxy-11,19-epoxy-21-hydroxy-5α-pregnane-3,20-dione, 10 parts of anhydrous pyridine and 2.1 parts of p-toluenesulfonyl chloride is permitted to stand at 0° C. for 18 hours. To the mixture are then added over a period of 5 minutes 10 parts of ice and 100 parts of water. The mixture is diluted with dichloromethane, washed successively with water, dilute aqueous hydrochloric acid, water, and aqueous sodium bicarbonate, dried over sodium sulfate and evaporated to dryness under vacuum. The residue, which contains the 11α-methoxy-11,19-epoxy-21-(p-toluenesulfonyloxy)-5α-pregnane-3,20-dione is warmed with a solution of 2 parts of sodium iodide and 60 parts of acetone for 10 minutes. The mixture is evaporated to dryness and the residue is extracted with dichloromethane. This extract is filtered and the filtrate is taken to dryness. The residue, which contains the 11α-methoxy-11,19-epoxy-21-iodo-5α-pregnane-3,20-dione, is stirred for 5 minutes with a mixture of 2 parts of zinc and 10 parts of acetic acid. The mixture is then diluted with dichloromethane and filtered. The filtrate is washed with water, saturated aqueous sodium bicarbonate, dried over sodium sulfate and evaporated to dryness under vacuum. The residue, when triturated with methanol, yields crude 11α-methoxy-11,19-epoxy-5α-pregnane-3,20-dione which, when recrystallized from methanol, melts at about 147–148°. Infrared maxima are observed at about 3.40, 5.84, 8.78, 9.42, 9.70, 10.20 and 11.58 microns. The specific rotation of the chloroform solution [α]_D is +133.4°.

Substitution as a starting material of an equivalent amount of 2 parts of 11α-ethoxy-11,19-epoxy-21-hydroxy-5α-pregnane-3,20-dione yields 11α-ethoxy-11,19-epoxy-5α-pregnane-3,20-dione. The compound shows infrared maxima at about 3.4 and 5.83 microns.

Example 7

To a warm solution of 1 part of 11α-methoxy-11,19-epoxy-5α-pregnane-3,20-dione in 25 parts of acetone and 10 parts of water are added 0.05 part of p-toluenesulfonic acid. The solution is concentrated under vacuum to a small volume at room temperature and the resulting crystalline precipitate is collected on a filter, washed with water and dried. The precipitate is recrystallized from a mixture of acetone and petroleum ether to yield 11α-hydroxy-11,19-epoxy-5α-pregnane-3,20-dione melting at 156–158° C. Infrared maxima are observed at 2.95, 3.40, 5.82, 5.88, 7.33, 8.79, 9.39, 9.85, and 10.68 microns. The compound has the structural formula

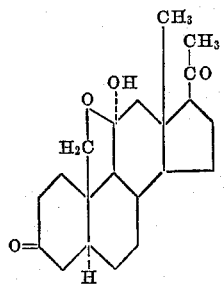

Example 8

A solution of 1 part of 11α-methoxy-11,19-epoxy-21-hydroxy-5α-pregnane-3,20-dione, 6 parts of sodium metaperiodate, 60 parts of acetone and 10 parts of water is permitted to stand for 1 day at room temperature. The mixture is then diluted with 60 parts of water and concentrated by evaporation of the acetone at room temperature under vacuum. The resulting precipitate is collected on a filter, washed with water and dried. On crystallization from acetone and petroleum ether 3-oxo-11α-hydroxy-11,19-epoxy-5α-androstane-17β-carboxylic acid melts at about 195–196° C. Infrared maxima are observed at 2.86, 2.96, 3.38, 5.81, 5.88, 7.75, 8.78, 9.44, 9.85, 10.20, 10.95 and 12.18 microns. The compound has the structural formula

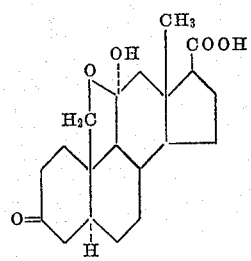

Example 9

A solution of 4 parts of 3-oxo-11α-hydroxy-11,19-epoxy-5α-androstane-17β-carboxylic acid in 100 parts of methanol and 0.5 part of p-toluenesulfonic acid is permitted to stand for 2 hours after which it is taken to dryness and the residue is triturated with acetone and petroleum ether. The crude crystalline product is recrystallized from methanol to yield 3-oxo-11α-methoxy-11,19-epoxy-5α-androstane-17β-carboxylic acid which shows infrared maxima at about 3.4, 5.85, and 5.9 microns.

Substitution of 100 parts of ethanol in the procedure of the foregoing example yields 3-oxo-11α-ethoxy-11,19-epoxy-5α-androstane-17β-carboxylic acid which shows maxima at about 3.4, 5.84, and 5.9 microns.

What is claimed is:

1. A compound of the structural formula

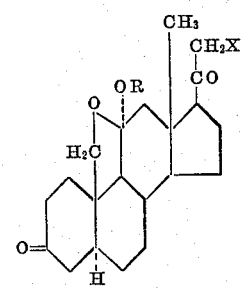

wherein R is a member of the class consisting of hydrogen and lower alkyl radicals and X is a member of the class consisting of hydrogen and the hydroxyl radical.

2. 11α-methoxy-11,19-epoxy-21-hydroxy-5α-pregnane-3,20-dione.
3. 11α-hydroxy-11,19-epoxy-21-hydroxy-5α-pregnane-3,20-dione.
4. 11α-methoxy-11,19-epoxy-5α-pregnane-3,20-dione.
5. 11α-hydroxy-11,19-epoxy-5α-pregnane-3,20-dione.
6. A compound of the structural formula

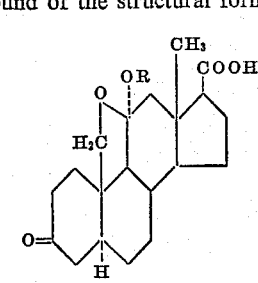

wherein R is a member of the class consisting of hydrogen and lower alkyl radicals.

7. 3 - oxo - 11α - hydroxy - 11,19 - epoxy - 5α - androstane-17β-carboxylic acid.
8. 3 - oxo - 11α - methoxy - 11,19 - epoxy - 5α-androstane-17β-carboxylic acid.

References Cited in the file of this patent

Baumgartner et al.: "Experientia," vol. XIII, No. 5, May 15, 1957, pages 185–7.